United States Patent [19]

Locher

[11] 3,844,246

[45] Oct. 29, 1974

[54] AMPHIBIOUS BICYCLE

[76] Inventor: Benjamin Carter Locher, 164 E. E St., La Porte, Tex. 77571

[22] Filed: June 25, 1971

[21] Appl. No.: 156,903

[52] U.S. Cl. .................................... 115/2, 115/27
[51] Int. Cl. .............................................. B60f 3/00
[58] Field of Search............ 115/2, 19, 25, 1 R, 1 B, 115/26, 26.3, 27; 272/71, 73; 416/84, 85, 86; 280/234, 233

[56] References Cited
UNITED STATES PATENTS

| 799,667 | 9/1905 | Payette | 115/2 |
|---|---|---|---|
| 1,034,278 | 3/1912 | Munsen | 115/2 |
| 2,542,143 | 2/1951 | Jones | 115/25 |
| 2,757,631 | 8/1956 | Truter | 115/2 |

FOREIGN PATENTS OR APPLICATIONS

| 864,857 | 4/1961 | Great Britain | 115/1 B |

Primary Examiner—Trygve M. Blix
Assistant Examiner—Barry L. Kelmachter

[57] ABSTRACT

An amphibious bicycle capable of operation on either land or water. The bicycle is a self contained convertible structure so that it may be readily adapted to operation in either environment comprising conventional wheels and pedal, sprocket, chain drive system but also including front and rear pontoons which are adapted to pivot about the frame of the bicycle from a retracted above-wheel position when in the land operating mode to a deployed, adjacent-wheel position when in the water operating mode. An attachable propeller, drive shaft, and gearing means cooperatively engages the pedal-sprocket structure for powered mobility when in water.

19 Claims, 18 Drawing Figures

PATENTED OCT 29 1974

3,844,246

Benjamin Carter Locher
INVENTOR

BY  Bernard A. Reiter
ATTORNEY

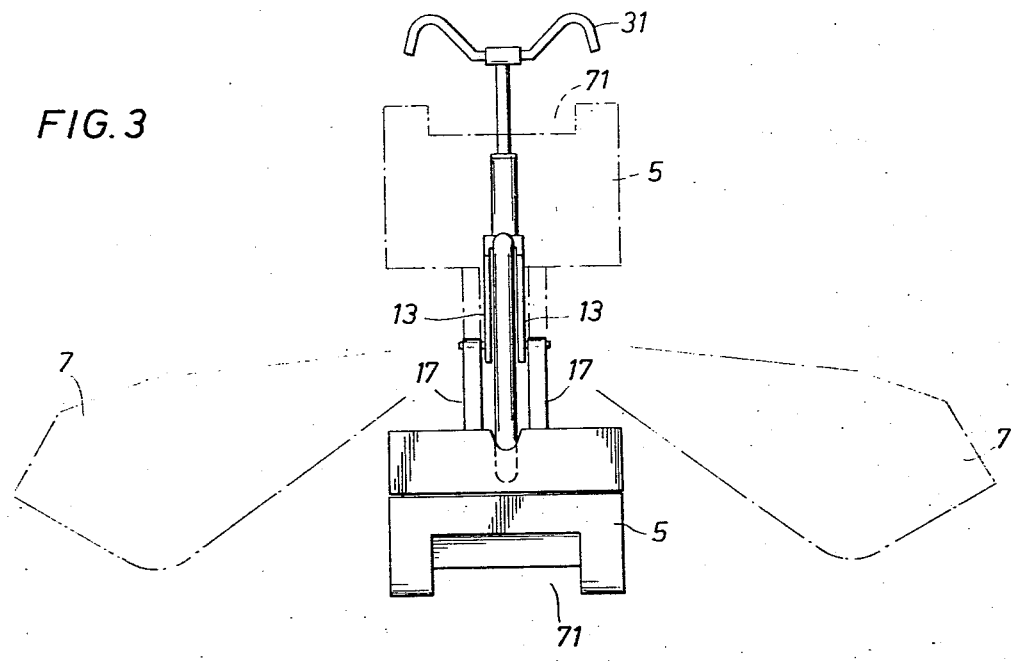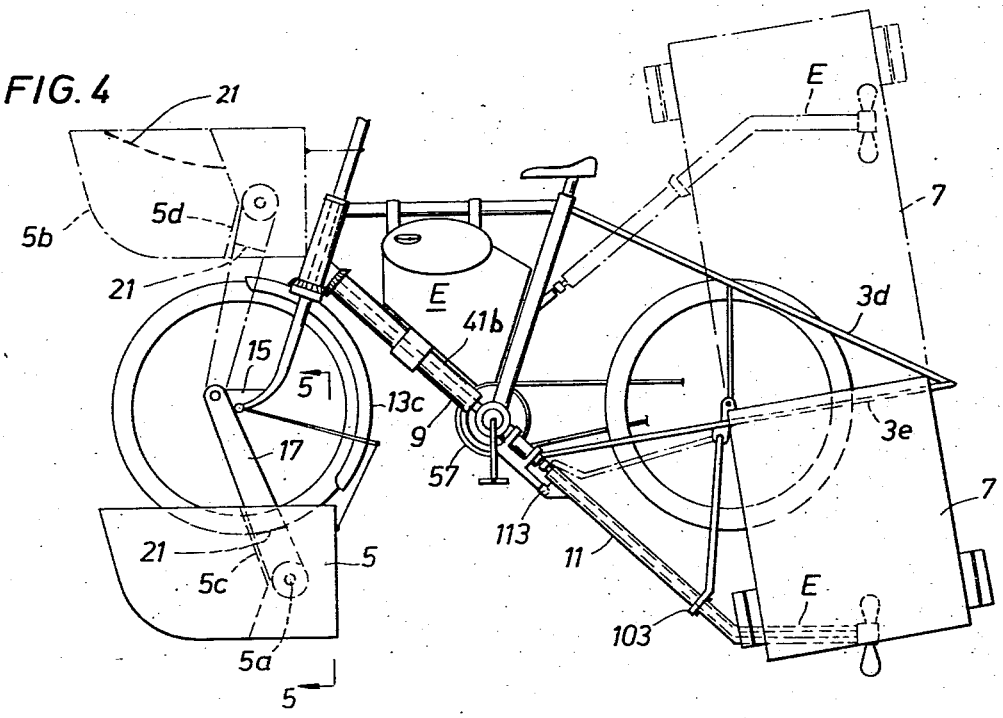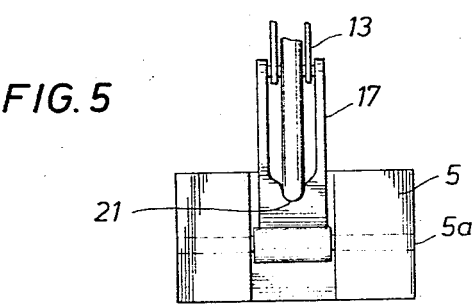

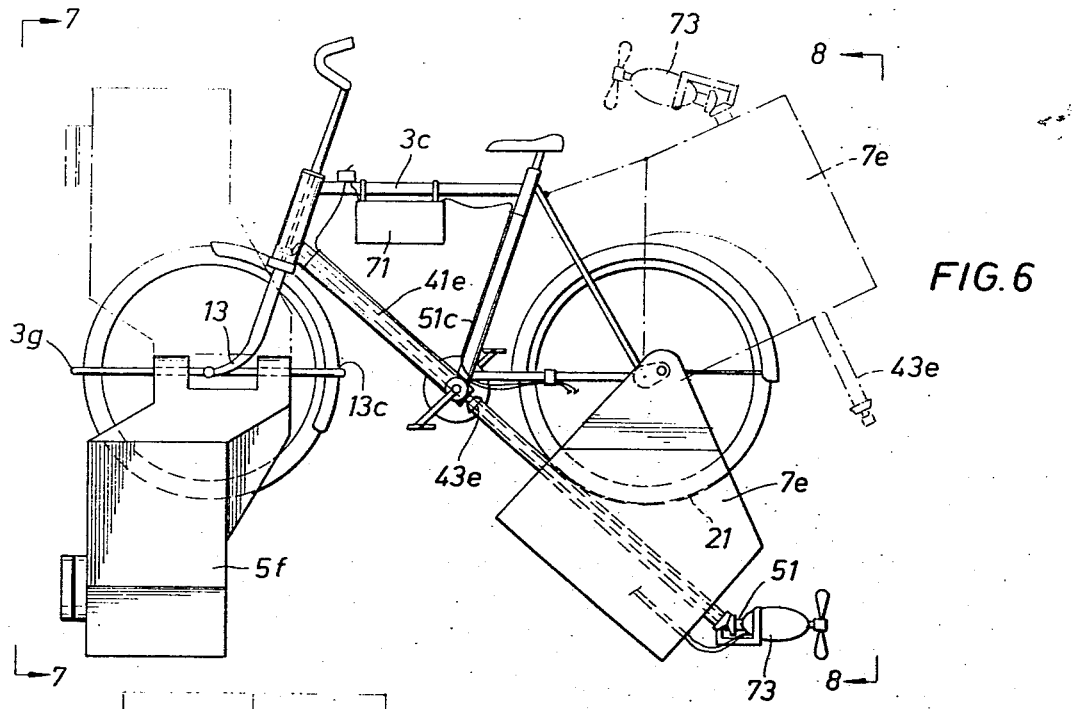
FIG.6
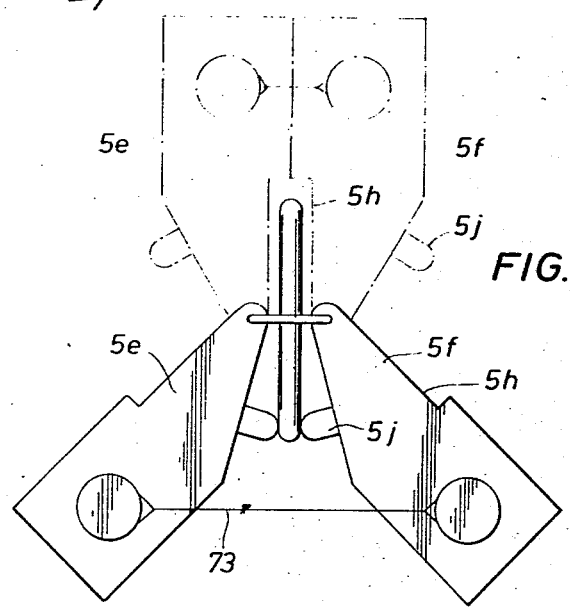
FIG.7
FIG.8
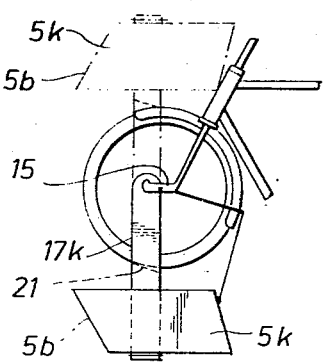
FIG.9
Benjamin Carter Locher
INVENTOR
BY   Bernard A. Reiter
ATTORNEY Benjamin Carter Locher
INVENTOR BY  Bernard A. Reiter

ATTORNEY

Benjamin Carter Locher
INVENTOR

BY  Bernard A. Reiter

ATTORNEY

Benjamin Carter Locher
INVENTOR

BY   Bernard A. Reiter

ATTORNEY

AMPHIBIOUS BICYCLE

BACKGROUND OF THE INVENTION

This invention relates to water cycles and more particularly to cycles which may be operated either on land or on water.

Man has, since early times, conceived in fanciful illusions of a device that would travel on both land and water. Such devices were soon created in the forms of bicycles and were in fact patented and constructed with varying degrees of success. Early patents bear evidence to man's such early desires and reference may be made to them in U.S. Pat. Nos. 1,060,620 and 1,034,278. Devices such as these, though illustrating a reduction to practice of man's interest, fell far short of a both practical and commercially feasible cycle construction. Such devices were, for example, incapable of aquatic guidance. Aquatic stability was hazardous. Deployment of pontoons and retraction thereof upon re-entry to land was complex, time consuming, and frequently frustrating. Moreover, mobility in the water was unsatisfactory as power transmission mechanics was crude and inefficient. In addition to all of these many shortcomings, few if any of the prior art aquatic bicycles were capable of either or both land and water operation and by no means could they, in reality, be considered so readily convertible as to be termed "amphibious". It is with these shortcomings in mind that there was conceived, in the form of the present invention, an amphibious cycle.

BRIEF SUMMARY OF THE INVENTION

The present invention is intended to substantially reduce, if not obviate, certain of the more prevalent disadvantages and shortcomings explained hereinabove with respect to prior art aquatic cycles. Specifically, this invention is directed to an aquatic cycle which is of amphibious capability and which may be as easily and reliably operated on land as on water. A principal feature and object of the invention therefore is to provide a readily retractable and deployable flotation gear which is adapted to be carried by the cycle in retracted position when the cycle is operated on the land and in the deployed position when operated in water.

Another object of this invention is to provide a readily deployable flotation gear which imparts reliable stability to the vehicle when it carries a passenger in the water.

Still another principal object of the invention is to provide an aquatic cycle in which the steering mechanism thereof is equally as effective on land or on water.

Yet another feature and object of the invention is the provision for an aquatic cycle having an improved steering mechanism in the water.

A still further feature and advantage of the invention is the provision for an amphibious bicycle in which the conventional pedal type propulsion system used on land is readily converted to and utilized for the motive power in water.

These and numerous other objects and features of the invention will become more readily apparent from the following detailed description which includes a preferred embodiment and several exemplary modifications thereof, which is shown in the accompanying drawings, wherein like numerals denote like parts in the several views and wherein:

DESCRIPTION OF THE DRAWINGS

FIG. 3 is a front view along the plane 3—3 of FIG. 1 and in which the front pontoon is shown in solid lines in the deployed position, and in dotted lines in the retracted position.

FIG. 4 illustrates a modified form of the invention in which the steering couplings are external and the drive couplings internal.

FIG. 5 illustrates a sectional view along the plane 5—5 of FIG. 4.

FIG. 6 illustrates still another alternative form of the invention and which includes internal steering couplings and external drive couplings.

FIG. 7 is a front view along the plane 7—7 of FIGS. 6 and in which the front pontoons are shown in solid lines in deployed position, and in dotted lines in retracted position.

FIG. 8 is a rear view along the plane 8—8 of FIG. 6 and in which the rear pontoon is shown in deployed position.

FIG. 9 illustrates still another form of front pontoon construction.

DETAILED DESCRIPTION

Figure 1:
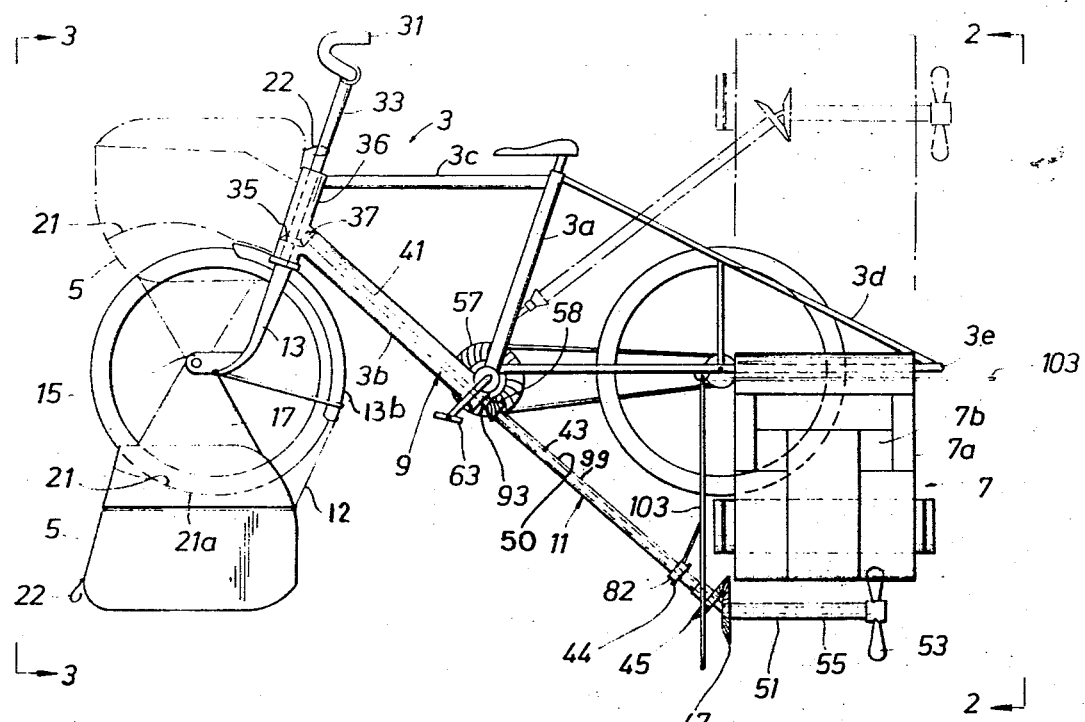
FIG. 1 is an elevation view showing a preferred embodiment of the amphibious cycle of the invention.

Reference may now be made to FIGS. 1 through 3 and 18 wherein there is shown a preferred embodiment of the amphibious cycle of the invention. The cycle comprises essentially a frame 3, a front pontoon 5, rear pontoons 7, and the steering shaft mechanism 9 and drive train 11. Drive train 11 is fixedly fastened and supported at its lower end by engagement of threaded nut 44 to hanger 103 which, with chain stay 3h forms a collapsible structural triangle consisting of train 11, hanger 103 and stay 2. Cycle frame 3 includes upstanding seat bar 3a and tubular frame member 3b which is adapted to enclose the steering shaft mechanism 9 described hereinafter. A distinguishing feature of the embodiment of FIG. 1 resides in the internal disposition of the steering mechanism and the external disposition of the drive train, all as will be now explained.

The front ends of frame member 3c and tubular frame 3b intersect front member 36 and are connected thereto such as by welding. Extending from the front ends of fork member 13 are front pontoon support members 15 which are characterized by an axial bore for receiving axles that support pivoting arms 17 of front pontoon 5. Also it may be seen here that hanger 103 is characterized by a rotative bearing 104 which permits rotation of housing 99 while the hanger supports the housing in operative position from the frame 3, or more specifically from frame chain stay 3h (see FIG. 4). Upon removal of the drive components, such as housing 99, the hanger 103 is rotated to horizontal position where it may be locked in place by any conventional means, such as the wedge lock on any conventional bicycle kick stand. It will thus be visualized that the detachable drive and navigation means herein consists essentially of a rigid structural triangle arrangement formed by the cycle frame (chain stay 3h), hanger 103, and drive housing 99 (or shaft 43) depending on whether there is an internal or external drive configuration used. The pontoon 5 is thus adapted to swing around the front tire of the cycle on an axis which is parallel to the axis of rotation of the tire itself. It should be noted that the center of rotation of the pontoon is offset with respect to the axis of the wheel so that in this manner when the pontoon is rotated from the retracted to the deployed position, it is caused to move into frictional engagement when the cut out portion of the pontoon, defined by arcuate surface 21, contacts the tire. This particular design is characteristic of all modifications to the preferred embodiment. The pontoon is held in place by tension tie 12 connected to fender 13b. In this manner it will be recognized that the pontoon may be deployed to a reliably fixed position.

Figure 2:
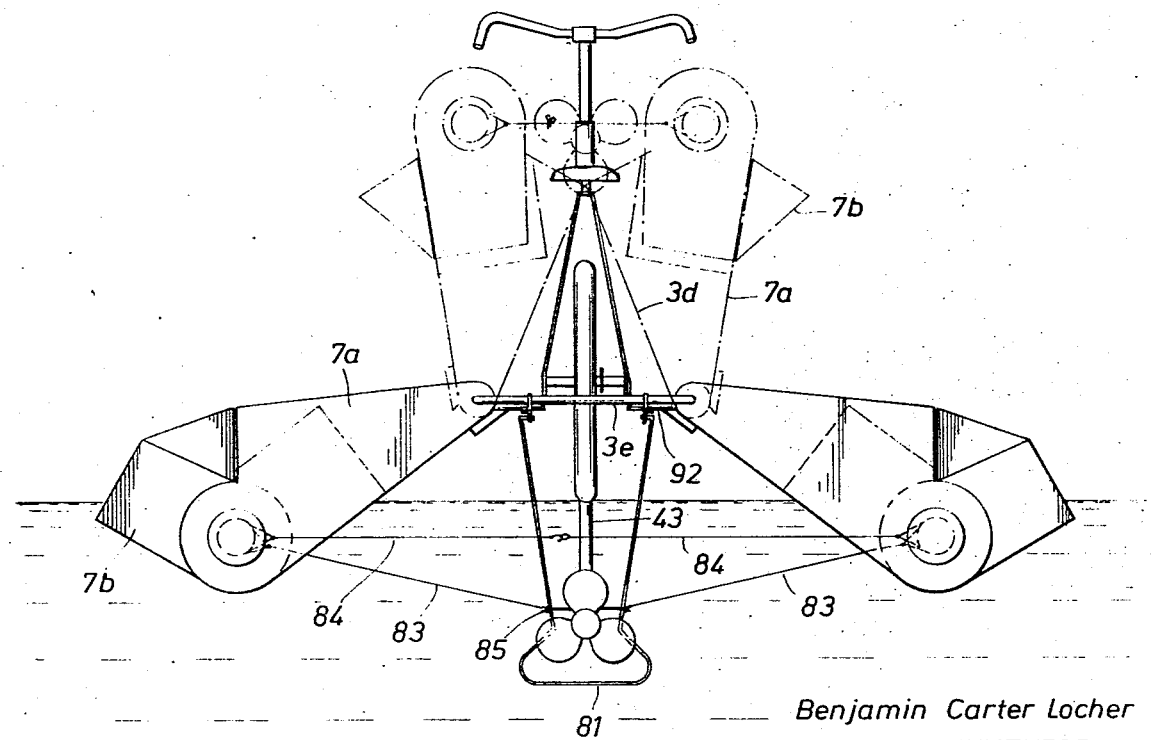
FIG. 2 is a rear view along the plane 2—2 of FIG. 1 and in which the rear pontoons are shown in solid lines in the deployed position, and in dotted lines in the retracted position.

The front pontoon, and also the rear pontoons, may be manufactured from an expanded polyethylene or other high flotation material. As best shown in FIG. 2, the rear pontoons are pivotally carried by rear support bar 3e which is reinforceably connected to seat bar 3a by the member 3d. Rear pontoons 7 may be of multipiece construction and therefore can, for example, comprise an arm section 7a and pivoted extension 7b carried thereby. Section 7b serves to act as an extending stabilizer when the pontoon 7 is in deployed position. When the pontoons are retracted, stabilizers 7b are rotated into an appropriate recess in arm section 7a, all as shown in dotted lines in FIG. 2. The axis of pivoted extension 7b is shown in FIG. 1 to be substantially parallel to frame member 3c, but may be either perpendicular or skew thereto.

With further reference to FIG. 2, there is shown four (4) cordlike tension ties 83, 84. Tension ties 83 connect the front of the left and right rear pontoons to hanger 81 with fasteners 85 while the aft portions of the pontoons are connected together with tension ties 84.

To propel the waterbike in water, the pedals are operated as if pedaling on land. The pedals simply rotate gear 57 (FIG. 1) which acts against gear 58. Gear 58 is in turn coupled to the upper end of a propeller drive tubing 50. The lower end of tubing 50 is engaged by gear 45, which in turn engages gear 47, gear 47 being fixedly connected to propeller drive tubing 51. On the aft end of tubing 51 is affixed a propeller 53 so that force imparted to the rotation of pedals 63 is transmitted through the tubings 50 and 51 in order to propel the cycle through the water.

Aquatic steering of the cycle is accomplsihed by maneuvering conventional handle bars 31. Affixed to steering column 33 intermediate handle bars 31 and fork 13 is gear 35 having an angled face thereon which is adapted to engage the cooperating angled face of steering shaft gear 37. Gear 37 is in turn affixed to steering shaft 41, the shaft 41 being housed within tubular frame 3b.

Figure 12:
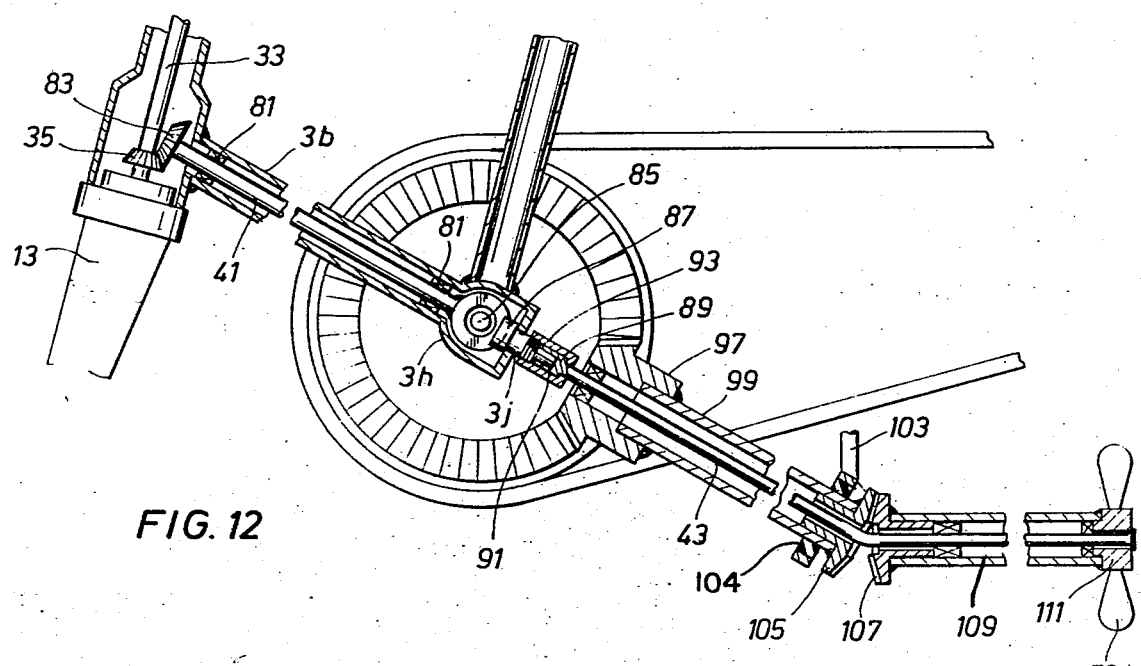
FIG. 12 illustrates an enlarged section view of the steering mechanism and drive train of FIG. 6.
Figure 18:
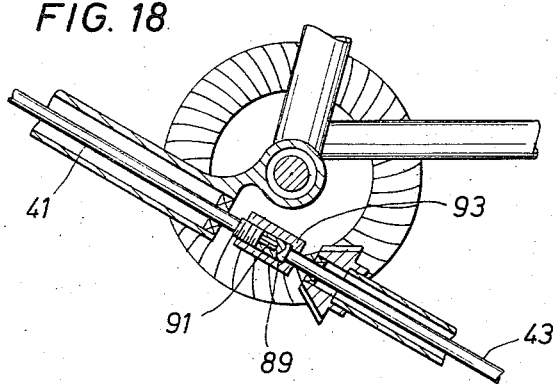
FIG. 18 illustrates an enlarged sectional view of the steering mechanism of FIG. 1.

As best shown in FIG. 18, steering shaft 41 is connected to lower steering shaft 43 via coupling 89, 91, 93 (all as described more particularly with respect to FIG. 12). Lower steering shaft 43 continues down and aft through the inside of propeller drive tubings 50 and 51. Thus it will be recognized that turning of the handle bars 31 results in a correlative movement of the position of propeller 53 thereby causing propeller 53 to be moved to the right or left so as to impart navigational control. Thus it is seen that operation of the cycle pedals 63 causes rotation of the propeller 53 and that such propulsion can occur while the cycle is being navigated in a preferred direction.

Figure 14:
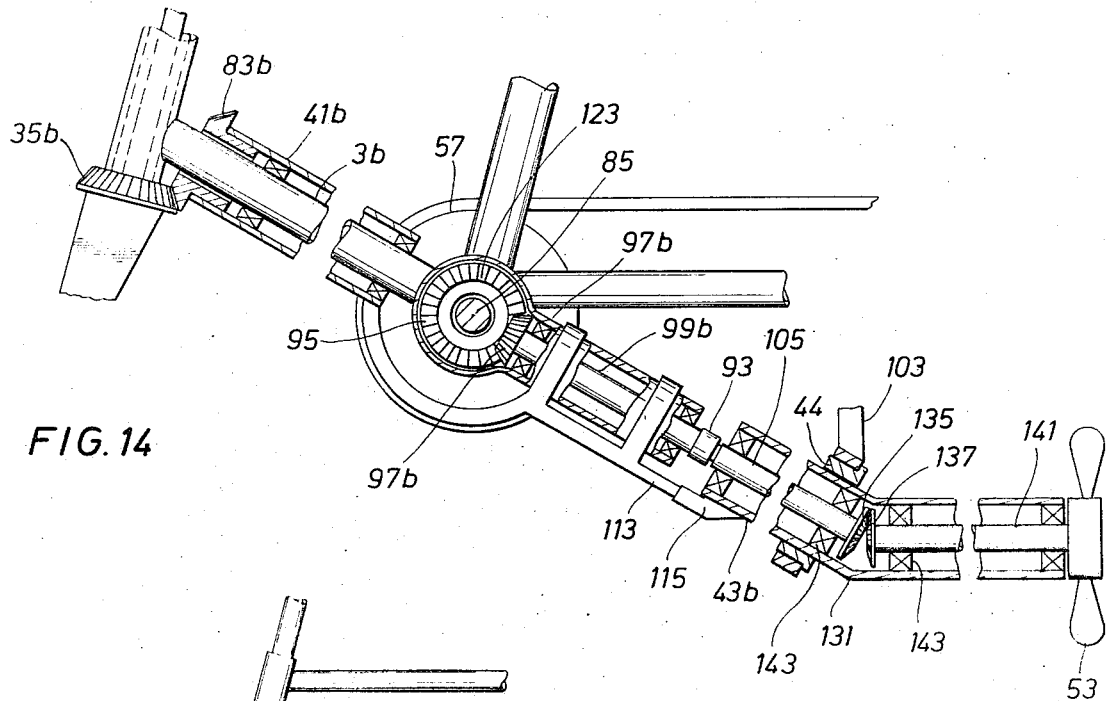
FIG. 14 illustrates an enlarged section view of the steering mechanism and drive train structure of FIG. 4.

Reference may now be made to the modified form of the invention as shown in FIGS. 4, 5 and 14. In this form the steering mechanism is designed exteriorly of the frame member, while the driving mechanism and drive gear is interiorly housed. Initially, however, reference may be made to the front pontoon which here takes the form of a dual-pivot construction in which the arm 17 is pivoted not only from support member 15 but also from pontoon 5 itself. The latter pivot point (5a) enables movement of the pontoon from its retracted to its deployed position without changing the direction of the front hull-shaped end 5b. Locking engagement of the pontoon in either the retracted or deployed position is accomplished by providing recessed internal inclined surfaces 5c which are adapted to engage the side of arm 17 when in the deployed position. Similarly there is provided internal inclined surface 5d which is adapted to engage and lock arm 17 when the pontoon is in its retracted position. Pivot point 5a is thus proximate to the intersection of the surfaces 5c and 5d. It will thus be appreciated that deployment of pontoon 5 for water operation causes arm 17 to bear on surface 5c and that due to hull-shaped surface 5d there is provided an upward lift to the cycle as it is pedaled through the water. For exemplary purposes there is also shown in FIG. 4 the provision for an engine E which may, through appropriate drive train 11, engage sprocket gear 57, or the like, in order to impart motive power to the propeller. Drive train 11 may be engaged at its upper end by any of the drive arrangements disclosed, such as explained hereafter with reference to FIG. 14, or as shown and explained with reference to FIG. 1, pertaining to the sprocket gears. At its lower end the drive train 11 is supported in fixed position with respect to the frame 3 by hanger 103 extending from frame 3, see FIG. 14 and FIG. 12 also. As noted above a modification to the steering mechanism 9 is provided. It is seen that mechanism 9 comprises the shaft 41b which engages lower steering shaft 43 through means of finger 113. With reference to FIG. 14 there is shown an enlarged view of this steering mechanism and drive train. Beveled gear 83b constitutes an integral portion of steering shaft 41b which in this instance is supported on frame bar 3b. Steering shaft 41b may be supported on the frame bar by Teflon bushings or other acceptable water and rust resistant bearing means. Steering shaft 41b is further characterized here by an integral lower finger member 113 which extends beneath the shaft and rearwardly toward lower steering shaft 43b. Lower steering shaft 43b is characterized by notched nose member 115 extending therebeneath and upwardly towards shaft 41b. The notch (not numbered) in nose member 115 is disposed to cooperatively receive therein the finger 113 so as to thereby form a cooperating coupling which effectively transmits the rotative motion of shaft 41b to the shaft 43b in a manner which effectively by-passes the rotative axis 85 of the pedals. Shaft 43b is supported at its lower end by hanger 103 and at its upper end by the enggement of nut 93 with drive bar 99b. This attachment uses a square drive fitting the same as described in more detail for FIG. 12. In this arrangement it will be readily recognized that steering shaft 43b constitutes an integral member which is angled (131) at its distal end in order to provide for a substantially horizontal support means for propeller 53. It will thus be further recognized that the drive bar 99b is driven by the rotation of the gear 95 which engages beveled gear 97b. The rotative movement is then transmitted through beveled gears 135 and 137 which are respectively supported on drive bar 105 and propeller drive shaft 141. Both the drive bar 105 and drive shaft 141 may be axially supported within the integral lower steering shaft housing 43b by appropriate bearings 143.

Still another modification of the amphibious bicycle is disclosed in FIGS. 6 through 8 wherein a modified internal steering and external drive mechanisms are shown. Here there is shown a cycle which may, for example, be powered by a battery driven electric motor, the battery 71 being slung beneath member 3c and the electric motor 73 being supported by propeller housing shaft 51 in the same manner as previously explained with respect to FIG. 1. Here the front pontoon system includes a pair of pontoons 5e, 5f, each of which is adapted to pivot laterally with respect to the longitudinal axis of the cycle. Such lateral pivoting occurs about front support bar 3g which is fixedly connected to the cycle at forks 13, and also to front fender 13c. As best shown in FIG. 7 the two pontoons pivot from their retracted position outwardly away from one another and downwardly into the deployed position. Appropriate cut-out means 5h are provided in the pontoons so that they may, when in retracted position, provide a well into which the front wheel may fit, See FIG. 7. Appropriate tie menas 73 are provided in order to maintain the pontoons in the proper deployed position required for stabilizing the cycle when in the water. Bumpers 5j may be provided on the pontoon wall so that wave forces, which might be imparted to the pontoons, cause them to move against the front tire and no further.

The rear pontoon is of singular construction and is pivotally supported near the rear axle of the cycle. As best shown in FIG. 6 the pontoon is adapted to rotatably pivot about the rear fender from its retracted position (dotted lines) to its deployed position (solid lines). When in deployed position the lower steering shaft 43e is easily connected to steering shaft 41e, all in the manner explained hereinafter. Similarly electrical conductors 51c are closed so that motor 73 can receive power from the battery 71. As shown in FIG. 8 the rear pontoon 73 is offset with respect to the wheel axis and is of integral construction and is adapted to rotate around the wheel axis and engage the tire in a manner similar to the integral front pontoon illustrated in FIG. 1.

Still another form of the invention is illustrated in FIGS. 9 through 11 and 15. Here the front pontoon differs from that of FIG. 1 in that it is not only forwardly swiveled, but is also clocked around in so doing. Arm 17k is pivotally mounted in straddling fashion about the wheel and to support 15. When in the retracted position, the pontoon has its front inclined surface 5b sloping downwardly and outwardly. When in the deployed position, the pontoon 5k is rotated so that the front sloped surface is pointed upwardly and outwardly and in this manner enables the pontoon to reflect wave forces in much the same manner as a ship's hull.

Figure 10:
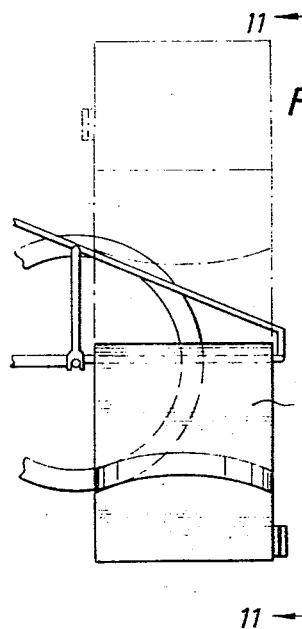
FIG. 10 illustrates an elevation view of still another form of rear pontoon construction.
Figure 11:
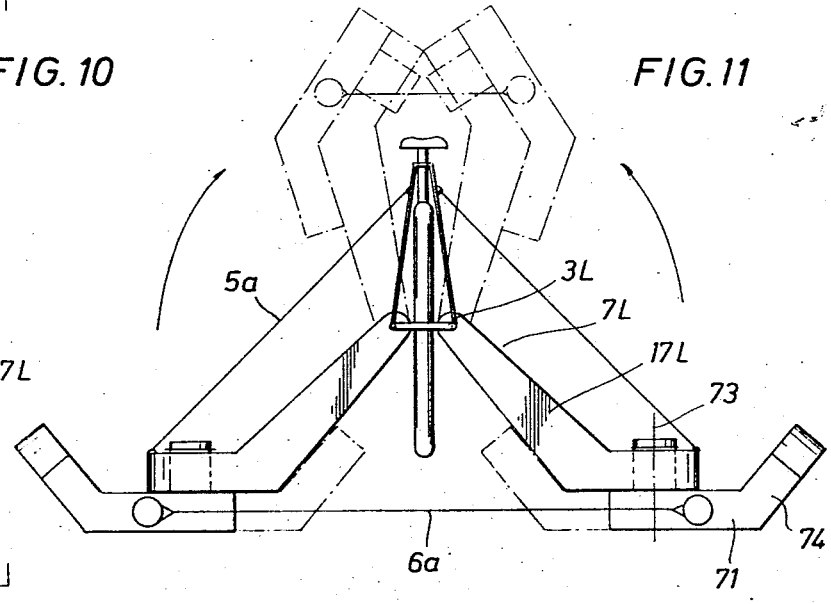
FIG. 11 shows a rear view of the rear pontoons of FIG. 10 along the plane 11—11 thereof.

In FIG. 10 there is shown an alternative rear pontoon system which takes the form of a pair of pontoons 7L. The pontoons 7L are pivotally connected to the cycle mounted support bar 3L, the axis of rotation being substantially parallel to the longitudinal axis of the cycle. Rope 5a prevents pontoons from moving further downward, whereas rope 6a holds pontoons in a deployed position. The pontoons themselves comprise the arm section 17L and the outer stabilizing member 71, see FIG. 11. Stabilizing member 71 is pivotally affixed to arm 17L about pivot point 73 so that the two sections therefore constitute an articulated pontoon which may be retracted into stowed position (see dotted lines) and after which the outer stabilizing member is rotated about axis 73 in order to produce a compact package when the cycle is operated on land. When in the water the outer stabilizing member imparts aquatic stability and maneuverability because of the substantial distance between stabilizing member 71 and the longitudinal axis of the cycle. Upwardly directed fingers 74 on member 71 add still further stability to the vehicle because of the substantial bouyance obtained at the end of a long moment arm from the cycle axis. It may be visualized that the bouyant volume created by outer stabilizing member 71 having fingers 4 thereon produces a substantial righting force if submereged.

Figure 15:
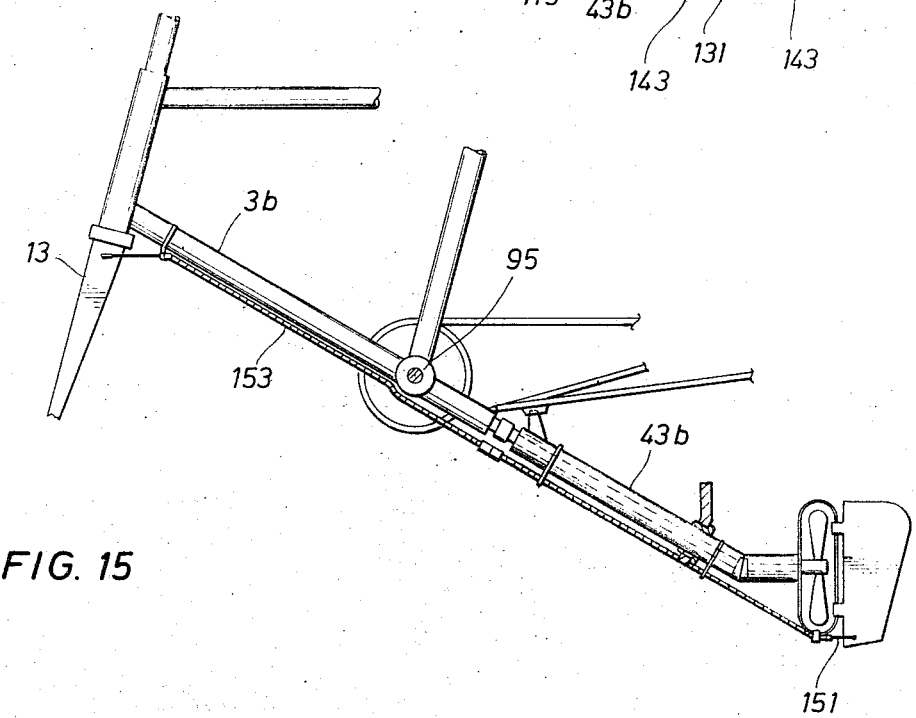
FIG. 15 illustrates still another modified form of steering mechanism.

Reference may now be made to FIG. 15. Here, one leg of fork 13 has connected thereto a respective push-pull wire 151. The wire 151 is housed in appropriate tubular means 153 which is affixed beneath frame 3b. The wires are in turn coupled to lower steering shaft 43b. This is in turn transmitted to propeller 53 in much the same manner described with respect to FIG. 14. The propeller 53 may be protectively enclosed within a cage member (not numbered). Affixed to the cage member in pivotal fashion is a rudder which is coupled to tension wire 151 so as to provide for navigational control.

Still another embodiment of the invention is represented in FIGS. 12, 13, 16 and 17. Particularly shown in FIG. 12 is the steering mechanism and drive train for use on an amphibious bicycle of the invention. Here, there is shown, for example, steering column 33 to which there is fixedly attached beveled gear 35. Column 33 is bolted or otherwise connected to fork 13 so that rotative movement of the column causes correlative movement of fork 13 and hence the front wheel supported by the fork. Tubular frame 3b (see FIG. 1) provides an enclosure for steering shaft 41 which is axially mounted therein, such as by Teflon grommets 81, or other bearings. Fixedly connected at th upper end of shaft 41 is beveled gear 83 whose beveled surface is angled to cooperatively engage the surface of beveled gear 35 so that rotative movement of column 33 causes similar rotative movement in shaft 41. The lower end of tubular frame 3b is further characterized by an expanded housing portion 3h having opening 3j therein. Extending through the housing 3h normal to the axis of tubular frame 3b is a pedal axle 85. Pedals 63 are conventionally mounted at the ends of pedal axle 85, see FIG. 1. Loosely disposed within housing 3h and extending through opening 3j is coupling bolt 87. Coupling bolt 87 is adpated to be connected to lower steering shaft 43. Shaft 43 constitutes an integral angled bar having at its upper end an expanded head 89 having a square internal recess. Square knob 91 extends from and is integrally connected to coupling bolt 87, the knob being adapted to cooperatively fit within recess 89. Internally threaded draw sleeve 93 loosely surrounds the expanded section and is adapted to threadably engage coupling bolt 87 so as to link lower steering shaft 43 to shaft 41. It may thus be visualized that rotation of shaft 41 will cause correlative movement of shaft 43 which in turn results in lateral movement of the propeller 53 to either side of the cycle longitudinal axis.

Propulsion of the cycle is accomplished by conventional pedaling thereof. The conventional sprocket, however, includes gear teeth appropriately arranged thereon so as to engage a beveled, tubular drive gear 97. The beveled drive gear is integrally connected to tubular drive housing 99. The tubular drive housing 99 may be appropriately supported at its rearward end by hanger bar 103 which is in turn affixed to the cycle frame in any appropriate manner such as by pivotal attachment at aperture 100. Integrally affixed to the rearward end of drive housing 99 is another beveled gear 105 having angular surface teeth thereon which are so arranged as to cooperatively engage the beveled gear 107, the latter being integrally connected to drive housing extension 109. It will thus be recognized that drive housing extension 109, propeller mount 111, propeller 53 and beveled gear 107 constitutes an integral assembly which is supported by steering shaft 43 which extends therethrough. Shaft 43 further brings beveled gear 107 into abutting relation with beveled gear 105 so that rotative movement of the tubular drive housing 99 causes gear 107 to move about the face of gear 105.

Figure 13:
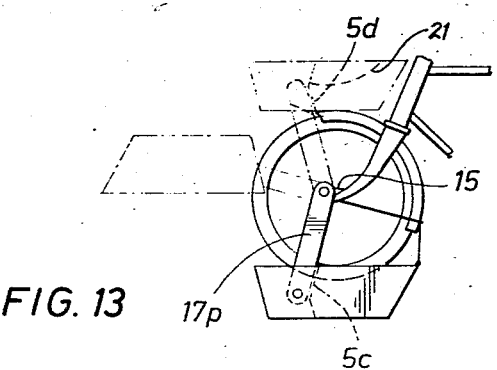
FIG. 13 illustrates another form of the front pontoon.

FIG. 13 is a modified type of pontoon deployment mechanism that may be used with the amphibious cycle having the steering and drive train mechanism of FIG. 12. Of particular significance is recognition of the pivoting arrangement supporting the pontoon. Arm 17p is pivotally connected both to support 15 and to the pontoon itself. The pontoon is characterized by the inner bearing surfaces 5d and 5c, which operate as explained with respect to FIG 4. In addition, resting surface 21 is adapted to frictionally engage the circumferential edge of the tire so as to lock the pontoon in fixed position. In operation the pontoon is adapted to be rotated into position from its retracted to its deployed condition. Isolated rotational positions are shown as positions 2, 3 and 4 in FIG. 13. Thus the pontoon is adapted to rotate 360° into frictional engagement with the tire and to subsequent affixation to the lower portion of the fender or other cycle structure.

A modified rear pontoon construction is suggested with respect to the cycle of FIG. 12. Such rear pontoon structure is exemplified by FIG. 16 wherein a pair of butterfly-type pontoons 7e, 7f are pivotally connected by axle bolts 7g (see FIG. 17) to a frame member of the cycle. It may be noted that the two pontoons are angularly related to the central vertical axis of the cycle (see FIG. 17) so that the distal ends of the pontoons are most remotely disposed with respect to the cycle, thereby affording improved stability. Pontoon extensions 88 pull partially out of pontoons 7e, 7f and are fastened with pin 89 to provide enhanced stability in the water. The pontoons are adapted to swing about the axle bolts 7g and are configured so that when swung upwardly they will move to a substantially vertical position. Here the pontoons may be tied or otherwise latched by appropriate means. When deployed, the pontoons are adapted to be locked in fixed position, this being accomplished by any simple locking means such as bolt 7h which is adapted to move into engaging contact with a frame member such as 7i. A lug section 7k may be constructed integrally with the pontoon so as to carry the bolt as an operative portion thereof. When deployed, the pontoons may be tied together by appropriate means such as a latching wire, cable or connecting rods as illustrated in FIG. 17, and as previously explained for exemplary purposes with respect to FIG. 2.

By way of summary now, certain advantageous features common to the various designs shown may be pointed out. In the preferred embodiment, the steering arrangement is internal while the drive system and drive gear is external. The lower steering shaft assembly 43 is supported on swinging hanger 103 which may be moved to the horizontal position for land operation. Threaded nut 44 permits removal of lower steering shaft 43 which may then be stowed adjacent seat bar 3a as shown in FIG. 1. The rear pontoons are then easily moved from their stopped positions abutting angle pieces 92 to a substantially vertical condition where they are tied or otherwise fastened adjacent to the stowed drive shaft, see FIG. 2. It will be recognized here that the internal steering mechanism is in no wise disturbed regardless of whether the cycle is in its water or land mode. Front pontoon 5 is easily disengaged from its frictional contact with the tire and rotated about support member 15 into its retracted state, using hook 22 to hold it in place.

By contrast, the cycle of FIG. 4 shows an alternative forwardly swinging hanger means 103 and hub mounted drive mechanism which is of interior configuration. By contrast to FIG. 1, the steering mechanism here is external and operates through the finger 113 construction as previously explained. The rear pontoons deploy to the side and at an angle while the front pontoon is supported by the arms 17 which is pivoted at each end.

Figure 17:
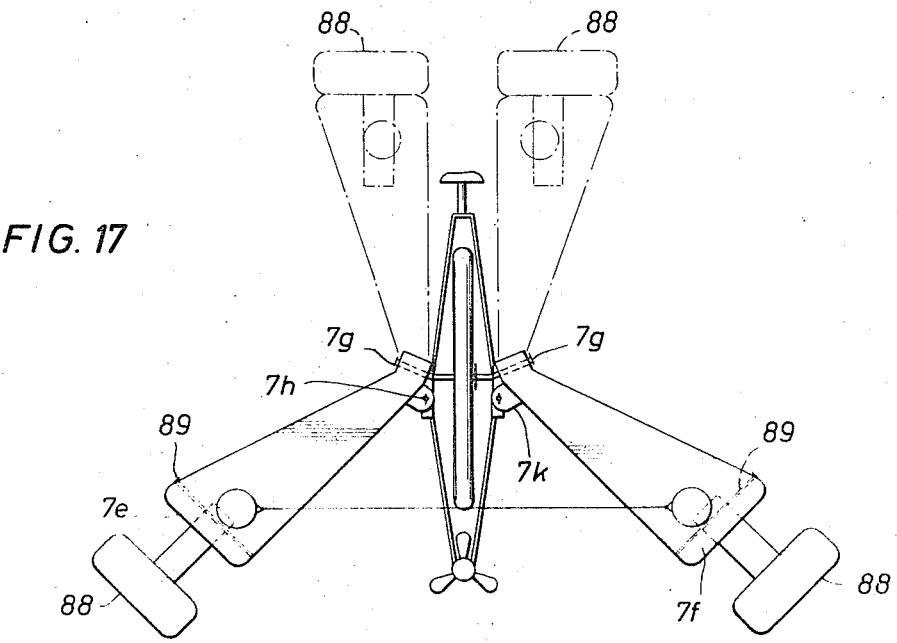
FIG. 17 is a rear view of the pontoon system of FIG. 16 along the plane 17—17 thereof.
Figure 16:
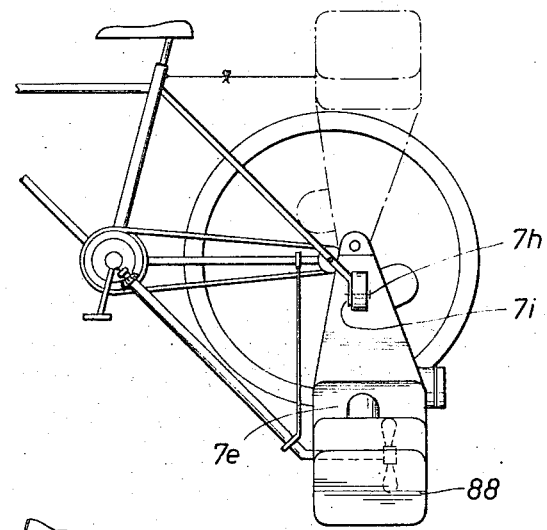
FIG. 16 illustrates yet another form of the rear pontoon system.

FIG. 6 illustrates varying forms of pontoon structures and deploying mechanisms as do FIGS. 16 and 17. FIGS. 12 and 14 illustrate slightly modified forms of drive mechanisms for use with their respective amphibious cycles.

Although the present invention has been set forth with a preferred embodiment and several suggested modifications thereof, it is particularly pointed out that these illustrations of the invention are set forth for exemplary purposes only and are not, in any manner, to be construed as limiting. The preferred embodiment and exemplary modifications are, therefore, to be construed as illustrative of the spirit of the invention and the invention itself is to be defined as set forth in the following claims as they may be interpreted by the specification and drawings herein.

Therefore, that which is claimed and desired to be secured by United States letters Patent is:

1. In an improved cycle means of amphibious design which may be selectively converted from a first mode of operation for travel over water to a second mode of operation for travel over land, and back to said first mode of operation comprising:

a frame having a steering means and first and second wheel means, said steering means operatively connected to said first wheel means for turning it; and propulsion means carried by said frame operatively connected to said second wheel means for causing rotation thereof;

pontoon means pivotally affixed to said frame adjacent each said first and second wheel means and being adapted to be fixedly, selectively positioned in a first location below the axis of rotation of each said wheel means and alternately in a second location substantially above the axis of rotation of said wheel means so as to thereby provide for mobility of the cycle in water when the pontoon means are in their first position and mobility on land when in their second position, and unitary, detachable aquatic drive and navigation means jointly coupled respectively to said propulsion means and said steering means when the said pontoon means are in their first position said drive and navigation means comprising means for laterally moving said aquatic drive for imparting navigational control.

2. The cycle of claim 1 wherein the drive assembly of said unitary, detachable aquatic drive and navigation means comprises a reticulated shaft having mechanical gears on a first portion thereof for engaging said propulsion means and a propeller on a second portion thereof and which is adapted to rotate upon actuation of said propulsion means said second portion of said reticulated shaft imparting said navigational characteristic by directional control of said propeller.

3. The cycle of claim 2 wherein the first portion of said shaft is angularly disposed in the vertical plane and the second portion is disposed substantially horizontally in the vertical plane so that rotative power may be transmitted downwardly and horizontally so as to propel the cycle through the water.

4. The cycle means of claim 1 wherein at least one of said pontoon means is rotatable about an axis substantially parallel to the longitudinal axis of the cycle frame said pontoon means being disposed adjacent the rearward of said wheel means and on either side thereof so as to provide for stabilization of the cycle when in water.

5. The cycle of claim 4 wherein the pontoon means on either side of the wheel is characterized by an outer stabilizer member which is hingedly affixed to the pontoon means so as to pivotally deploy outwardly from the cycle in order to enhance stabilization thereof.

6. The cycle means of claim 4 wherein the drive assembly of said unitary, detachable aquatic drive and navigation means comprises a reticulated shaft having mechanical gears on a first portion thereof for engaging said propulsion means and a propeller on a second portion thereof and which is adapted to rotate upon actuation of said propulsion means.

7. The cycle means of claim 6 wherein the first portion of said shaft is angularly disposed in the vertical plane and the second portion is disposed substantially horizontally in the vertical plane so that rotative power may be transmitted downwardly and horizontally so as to efficiently propel the cycle through the water.

8. In an improved cycle means of amphibious design which may be selectively converted from a first mode of operation for travel over water to a second mode of operation for travel over land, and back to said first mode of operation comprising:

a frame having a steering means and a first and second wheel means, said steering means operatively connected to said first wheel means for turning it; and propulsion means carried by said frame operatively connected to said second wheel means for causing rotation thereof, pontoon means pivotally affixed to said frame adjacent each said first and second wheel means and being adapted to be fixedly, sleectively positioned in a first location below the axis of rotation of each said wheel means and alternately in a second location substantially above the axis of rotation of said wheel means so as to thereby provide for mobility of the cycle in water when the pontoon means are in their first position and mobility on land when in their second position, and unitary, detachable aquatic drive and navigation means jointly coupled respectively to said propulsion means and said steering means when the said pontoon means are in their first position, said pivotally mounted pontoon means being supported by a rotatable arm and being further characterized by an internal arcuate wall surface disposed with respect to the arm pivot so as to limit movement of the pontoon beyond a predetermined position due to engagement of said arcuate wall surface with said first wheel means.

9. For use with an amphibious cycle having a frame means, front and rear wheel means mounted on the frame means, pontoon means pivotally supported from the frame means so as to convert the cycle from a land operating-retractive position to a water operating-deployed position, and sprocket means supporting pedals therefrom for rotating the sprocket means, the sprocket means and pedal means also being mounted on the frame and operatively associated with one of said wheel means for causing rotation thereof upon application of force to the pedals so as to thereby impart mobility, the improvement comprising:

a hanger means adapted to be pivotally affixed at an upper end thereof to the frame means and adapted to pivot downwardly into position adjacent to one of the wheel means, a lower end of said hanger means being characterized by connection means for fixedly holding a cycle drive shaft assembly means when the hanger means is in its lowered position, and a detachable cycle drive shaft assembly means having first and second end means, said first end means being adapted to operatively engage the sprocket means, said second end means operatively engaging said cycle hanger connection means so that the hanger means, cycle drive shaft assembly means, and the cycle frame means form a rigid strucutural configuration for reliably transmitting power from the pedals through the cycle drive shaft assembly means.

10. The improvement of claim 9 wherein the connection means at the lower end of the cycle drive shaft assembly means constitutes a threaded nut and,
 a drive shaft axially mounted interiorly of the assembly means for transmitting rotational movement thereof to a propeller at the lower end of the assembly means.

11. The improvement of claim 9 wherein the connection means at the lower end of the cycle drive shaft assembly means constitutes a clamp having a rotating bearing therein, said rotating bearing gripping said shaft on the exterior as it rotates therein and,
 said drive shaft assembly further including a mounting shaft disposed interiorly thereof and mounted to draw the assembly into engagement with the sprocket means so that the exterior may be driven by the sprocket means.

12. The improvement of claim 9 wherein the connection means at said hanger lower end is readily detachable, thereby releasing said drive shaft assembly means from the cycle and allowing retraction of the hanger means to a stowed position so as to provide for land operation of the cycle.

13. In an improved cycle means of amphibious design which may be selectively converted from a first mode of operation for travel over water to a second mode of operation for travel over land, and back to said first mode of operation comprising:
 a frame having a steering means and first and second wheel means, said steering means operatively connected to said first wheel means for turning it; and propulsion means carried by said frame operatively connected to said second wheel means for causing rotation thereof,
 pontoon means pivotally affixed to said frame adjacent each said first and second wheel means and being adapted to be fixedly, selectively positioned in a first location below the axis of rotation of each said wheel means and alternately in a second location substantially above the axis of said wheel means so as to thereby provide for mobility of the cycle in water when the pontoon means are in their first position and mobility on land when in their second position, and
 unitary detachable aquatic drive and navigation means jointly coupled respectively to said propulsion means and said steering means when the said pontoon means are in their first position, one of said pontoon means being rotatable radially about an axis of rotation parallel to the axis of the wheel means and is characterized by an rounded surface of radial dimension similar to the wheel but axially eccentric with respect thereto so that rotation of the pontoon means from the first to the second position results in its frictional engagement with the wheel means at the latter position, the wheel thereby acting as a stop and reinforcement surface.

14. In an improved cycle means of amphibious design which may be selectively converted from a first mode of operation for travel over water to a second mode of operation for travel over land, and back to said first mode of operation comprising:
 a frame having a steering means and first and second wheel means, said steering means operatively connected to said first wheel means for turning it; and propulsion means carried by said frame operatively connected to said second wheel means for causing rotation thereof,
 pontoon means pivotally affixed to said frame adjacent each said first and second wheel means and being adapted to be fixedly, selectively positioned in a first location below the axis of each wheel means and alternately in a second location substantially above the axis of rotation of said wheel means so as to thereby provide for mobility of the cycle in water when the pontoon means are in their first position and mobility on land when in their second position, and
 unitary, detachable aquatic drive and navigation means jointly coupled respectively to said propulsion means and said steering means when the said pontoon means are in their first position,
 at least one of said pontoon means rotatably mounted on an axis substantially parallel to the longitudinal axis of the cycle frame, said pontoon means being disposed adjacent the rearward of said wheel means and on either side thereof so as to provide for stabilization of the cycle when in water,
 the drive assembly of said unitary, detachable aquatic drive and navigation means comprising a reticulated shaft having mechanical gears on a first portion thereof for engaging said propulsion means and a propeller on a second portion thereof and which is adapted to rotate upon actuation of said propulsion means,
 the first portion of said shaft being angularly disposed in the vertical plane and the second portion being disposed substantially horizontally in the vertical plane so that rotative power may be transmitted downwardly and horizontally so as to propel the cycle through the water,
 the navigation assembly of said unitary, detachable aquatic drive and navigation means comprising mechanical rotative couplings operatively connected from the steering means to the angularly disposed portion of said reticulated shaft so as to produce rotation of said portion about the longitudinal axis thereof, thereby turning said horizontal portion to varying lateral positions on either side of the vertical plane in order to impart directional control to the axis of said propeller.

15. The cycle means of claim 14 wherein said propulsion means includes a sprocket-like gear and rotatable driving peddles therefor,
 said unitary, detachable aquatic drive and navigation means including a coupler gear for engaging said sprocket-like gear and
 a retractable support hanger rotatably affixed to the cycle frame and being adapted to swing therebeneath to engage and position the aquatic drive and navigation means when it is operatively coupled to said sprocket-like gear, and to retract to an inoperative, nonfunctional position when the aquatic drive and navigation means is not operatively coupled to said sprocket-like gear, and
 frame means for releasably stowing said aquatic drive and navigation means when the latter is disengaged from the propulsion means so that the cycle may thereby be efficaciously converted to either land or aquatic usage.

16. The cycle of claim 15 wherein said pivotally mounted pontoon means is supported by a rotatable arm and further is characterized by an internal arcuate wall surface disposed with respect to the arm pivot so as to limit movement of the pontoon beyond a predetermined position due to engagement of said arcuate wall surface with said first wheel means.

17. In an improved cycle means of amphibious design which may be selectively converted from a first mode of operation for travel over water to a second mode of operation for travel over land and back to said first mode of operation comprisng:
  a frame having a steering means and first and second wheel means, said steering means operatively connected to said first wheel means for turning it; and proulsion means carried by said frame operatively connected to said second wheel means for causing rotation thereof,
  pontoon means pivotally affixed to said frame adjacent each said first and second wheel means and being adapted to be fixedly, selectively positioned in a first location below the axis of rotation of each said wheel means and alternately in a second location substantially above the axis of rotation of said wheel means so as to thereby provide for mobility of the cycle in water when the pontoon means are in their first position and mobility on land when in their second position, and
  unitary, detachable aquatic drive and navigation means jointly coupled respectively to said propulsion means and said steering means when the said pontoon means are in their first position,
  the drive assembly of said aquatic drive and navigation means comprising:
  a reticulated shaft having mechanical gears on a first portion thereof for engaging said propulsion means and a propeller on a second portion thereof and which is adapted to rotate upon actuation of said proulsion means,
  the first portion of said shaft being angularly disposed in the vertical plane and the second portion being disposed substantially horizontally in the vertical plane so that the rotative power may be transmitted downwardly and horizontally so as to propell the cycle through the water,
  the navigation means including mechanical rotative couplings operatively connected from the steering means to the angularly disposed portion of said reticulated shaft so as to produce rotation of said portion about the longitudinal axis thereof, thereby turning said horizontal portion to varying lateral positions on either side of the vertical plane in order to impart directional control to the axis of said propeller.

18. In an improved cycle means of amphibious design which may be selectively converted from a first mode of operation for travel over water to a second mode of operation for travel over land, and back to said first mode of operation comprising:
  a frame having a steering means and first and second wheel means, said steering means operatively connected to said first wheel means for turning it; and propulsion means carried by said frame operatively connected to said second wheel means for causing rotation thereof,
  pontoon means pivotally affixed to said frame adjacent each said first and second wheel means and being adapted to be fixedly, selectively positioned in a first location below the axis of rotation of each said wheel means and alternately in a second location substantially above the axis of rotation of said wheel means so as to thereby provide for mobility of the cycle in water when the pontoon means are in their first position and mobility on land when in their second position, and
  unitary, detachable aquatic drive and navigation means jointly coupled respectively to said propulsion means and said steering means when the said pontoon means are in their first position,
  said unitary, detachable aquatic drive and navigation means comprising a reticulated shaft having mechanical gears on the first portion thereof for engaging said propulsion means and a propeller on a second portion thereof and which is adapted to rotate upon actuation of said propulsion means, and mechanical rotative couplings operatively connected from the steering means to the angularly disposed portion of said reticulated shaft so as to produce rotation of said portion about the longitudinal axis thereof, thereby turning said horizontal portion to varying lateral positions on either side of the vertical plane in order to impart directional control to the axis of said propeller.

19. In an improved cycle means of amphibious design which may be selectively converted from a first mode of operation for travel over water to a second mode of operation for travel over land, and back to said first mode of operation comprising:
  a frame having a steering means and first and second wheel means, said steering means operatively connected to said first wheel means for turning it; and propulsion means carried by said frame operatively connected to said second wheel means for causing rotation thereof,
  pontoon means pivotally affixed to said frame adjacent each said first and second wheel means and being adapted to be fixedly, selectively positioned in a first location below the axis of rotation of each said wheel means and alternately in a second location substantially above the axis of rotation of said wheel means so as to thereby provide for mobility of the cycle in water when the pontoon means are in their first position and mobility on land when in their second position, and
  unitary, detachable aquatic drive and navigation means jointly coupled respectively to said propulsion means and said steering means when the said pontoon means are in their first position, and
  said unitary, detachable aquatic drive and navigation means including a reticulated shaft having mechanical gears on the first portion thereof for engaging said propulsion means and a propeller on the second portion thereof and which is adapted to rotate upon actuation of said propulsion means,
  said shaft being angularly disposed in the vertical plane and the second portion being disposed substantially horizontally in the vertical plane so that rotative power may be transmitted downwardly and horizontally so as to efficiently propel the cycle through the water, said detachable aquatic drive and navigation means further including mechanical rotative couplings operatively connected from the steering means to the angularly disposed portion of said reticulated shaft so as to produce rotation of said portion about the longitudinal axis thereof, thereby turning said horizontal portion to varying lateral positions on either side of the vertical plane in order to impart directional control to the axis of said propeller.

* * * * *